US009074911B2

(12) United States Patent
Goodwin et al.

(10) Patent No.: US 9,074,911 B2
(45) Date of Patent: Jul. 7, 2015

(54) MEASUREMENT SYSTEM AND METHOD UTILIZING HIGH CONTRAST ENCODER HEAD FOR MEASURING RELATIVE MOVEMENT BETWEEN OBJECTS

(75) Inventors: Eric Peter Goodwin, Tucson, AZ (US); Daniel Gene Smith, Tucson, AZ (US)

(73) Assignee: NIKON CORPORATION, Tokyo (JP)

( * ) Notice: Subject to any disclaimer, the term of this patent is extended or adjusted under 35 U.S.C. 154(b) by 316 days.

(21) Appl. No.: 13/593,839

(22) Filed: Aug. 24, 2012

(65) Prior Publication Data
US 2013/0048842 A1    Feb. 28, 2013

Related U.S. Application Data

(60) Provisional application No. 61/527,921, filed on Aug. 26, 2011.

(51) Int. Cl.
*G01D 5/34* (2006.01)
*G01D 5/347* (2006.01)
*G01D 5/38* (2006.01)

(52) U.S. Cl.
CPC .............. *G01D 5/34723* (2013.01); *G01D 5/38* (2013.01)

(58) Field of Classification Search
CPC ................................. G01D 5/38; G01D 5/266

USPC ................. 250/231.13–231.18; 356/486, 488
See application file for complete search history.

(56) References Cited

U.S. PATENT DOCUMENTS

| 4,829,342 | A | * | 5/1989 | Nishimura .................... 356/494 |
| 5,026,985 | A | * | 6/1991 | Ishizuka et al. .......... 250/231.16 |
| 2006/0180748 | A1 | | 8/2006 | Schoser et al. |
| 2011/0255096 | A1 | * | 10/2011 | Deck et al. .................... 356/488 |

OTHER PUBLICATIONS

U.S. Appl. No. 13/134,461, filed Jun. 8, 2011.

* cited by examiner

*Primary Examiner* — Thanh Luu
(74) *Attorney, Agent, or Firm* — Roeder & Broder LLP

(57) ABSTRACT

A measurement system (22) for measuring the position of a work piece (28) includes a measurement grating (34) and an encoder head (36). The encoder head (36) directs a measurement beam (252) at the measurement grating (34), the measurement beam (252) having an oval shaped cross-section. The encoder head (36) includes a beam shape adjuster (256) positioned in the path of an input measurement beam (240) having a substantially circular cross-sectional shape that transforms the input measurement beam (240) to provide the measurement beam (252) having the oval shaped cross-section.

25 Claims, 9 Drawing Sheets

MEASUREMENT SYSTEM AND METHOD UTILIZING HIGH CONTRAST ENCODER HEAD FOR MEASURING RELATIVE MOVEMENT BETWEEN OBJECTS

RELATED APPLICATIONS

The application claims priority on U.S. Provisional Application Ser. No. 61/527,921 filed on Aug. 26, 2011, entitled "HIGH CONTRAST ENCODER HEAD". As far as is permitted, the contents of U.S. Provisional Application Ser. No. 61/527,921 are incorporated herein by reference.

BACKGROUND

Exposure apparatuses are commonly used to transfer images from a reticle onto a semiconductor wafer during semiconductor processing. A typical exposure apparatus includes an illumination source, a reticle stage assembly that positions a reticle, an optical assembly, a wafer stage assembly that positions a semiconductor wafer, a measurement system, and a control system. The measurement system constantly monitors the position of the reticle and the wafer, and the control system controls each stage assembly to constantly adjust the position of the reticle and the wafer. The features of the images transferred from the reticle onto the wafer are extremely small. Accordingly, the precise positioning of the wafer and the reticle is critical to the manufacturing of high quality wafers.

There is a constant desire to improve the accuracy of the measurement system.

SUMMARY

The present invention is directed to a measurement system for measuring relative movement of a first object and a second object, the first object and the second object being movable relative to each other. For example, the first object can be a work piece, and the second object can be an optical assembly. The measurement system can include a measurement grating and an encoder head. The measurement grating can be coupled to one of the first object and the second object, and the encoder head can be coupled to the other of the first object and the second object. The encoder head directs a measurement beam at the measurement grating. In certain embodiments, the measurement beam has a cross sectional shape at the measurement grating with a first dimension along a first direction and a second dimension along a second direction that crosses the first direction, the first dimension being larger than the second dimension. In this embodiment, the measurement beam can have an oval shaped cross-section on the measurement grating.

Additionally, in one embodiment, the encoder head receives an input measurement beam having a substantially circular cross-sectional shape. In such embodiment, the encoder head includes a beam shape adjuster positioned in the path of the input measurement beam that transforms the input measurement beam to provide the measurement beam having the oval shaped cross-section. Further, the beam shape adjuster can include a prism pair that transforms the input measurement beam to provide the measurement beam having the oval shaped cross-section.

In some embodiments, the measurement grating can be a two dimensional grating. In such embodiments, the measurement beam impinging on the measurement grating creates a +1 order measurement beam and a −1 order measurement beam that are directed back at the encoder head.

In one embodiment, the +1 order measurement beam from the measurement grating is directed at an imperfect first redirector that directs a +1 order second pass beam at the measurement grating, and the −1 order measurement beam from the measurement grating is directed at an imperfect second redirector that directs a −1 order second pass beam at the measurement grating. In this embodiment, the redirectors can be designed so that a plane of incidence of the +1 order second pass beam on the measurement grating is not parallel to a plane of incidence of the −1 order second pass beam on the measurement grating. Further, the redirectors are designed so that the +1 order second pass beam and the −1 order second pass beam impinge at approximately the same location on the measurement grating.

In certain embodiments, a reference beam is directed at a reference grating that is part of the encoder head to create (i) a +1 order reference beam that is combined with the +1 order second pass beam at a module to form a +1 order interfering beam; and (ii) a −1 order reference beam that is combined with the −1 order second pass beam at the module to create a −1 order interfering beam. Further, the interfering beams can be partly overlapping at the module.

In one embodiment, the encoder head includes a beam shape adjuster positioned in the path of the interfering beams that transforms the interfering beams having an oval shaped cross-section to beams having a substantially circular cross-sectional shape.

Moreover, in one embodiment, the interfering beams are directed at a single lens that focuses the +1 order interfering beam onto a first optical fiber and focuses the −1 order interfering beam onto a second optical fiber.

The present invention is also directed to a measurement system comprising: (i) a measurement grating coupled to the work piece; and (ii) an encoder head that directs a measurement beam at the measurement grating; wherein the measurement beam impinging on the measurement grating creates a +1 order measurement beam and a −1 order measurement beam directed back at the encoder head; wherein the +1 order measurement beam from the measurement grating is directed at an imperfect first redirector that directs a +1 order second pass beam at the measurement grating, and wherein the −1 order measurement beam from the measurement grating is directed at an imperfect second redirector that directs a −1 order second pass beam at the measurement grating; and wherein a plane of incidence of the +1 order second pass beam on the measurement grating is not parallel to a plane of incidence of the −1 order second pass beam on the measurement grating.

Additionally, the present invention is also directed to a combination comprising (i) a stage assembly including a stage that retains a work piece, and a stage mover assembly that moves the stage and the work piece, and (ii) the measurement system of claim 1 that measures the position of the work piece. In yet another embodiment, the present invention is directed to an exposure apparatus including an illumination system, and the combination as described above that moves the stage and the work piece relative to the illumination system and measures the position of the work piece. In still another embodiment, the present invention is directed to a process for manufacturing a device that includes the steps of providing a substrate and forming an image on the substrate with the exposure apparatus.

Further, the present invention is directed to a method for measuring the position of a work piece, the method comprising the steps of coupling a measurement grating to the work piece; and directing a measurement beam at the measurement grating with an encoder head, the measurement beam having an oval shaped cross section.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
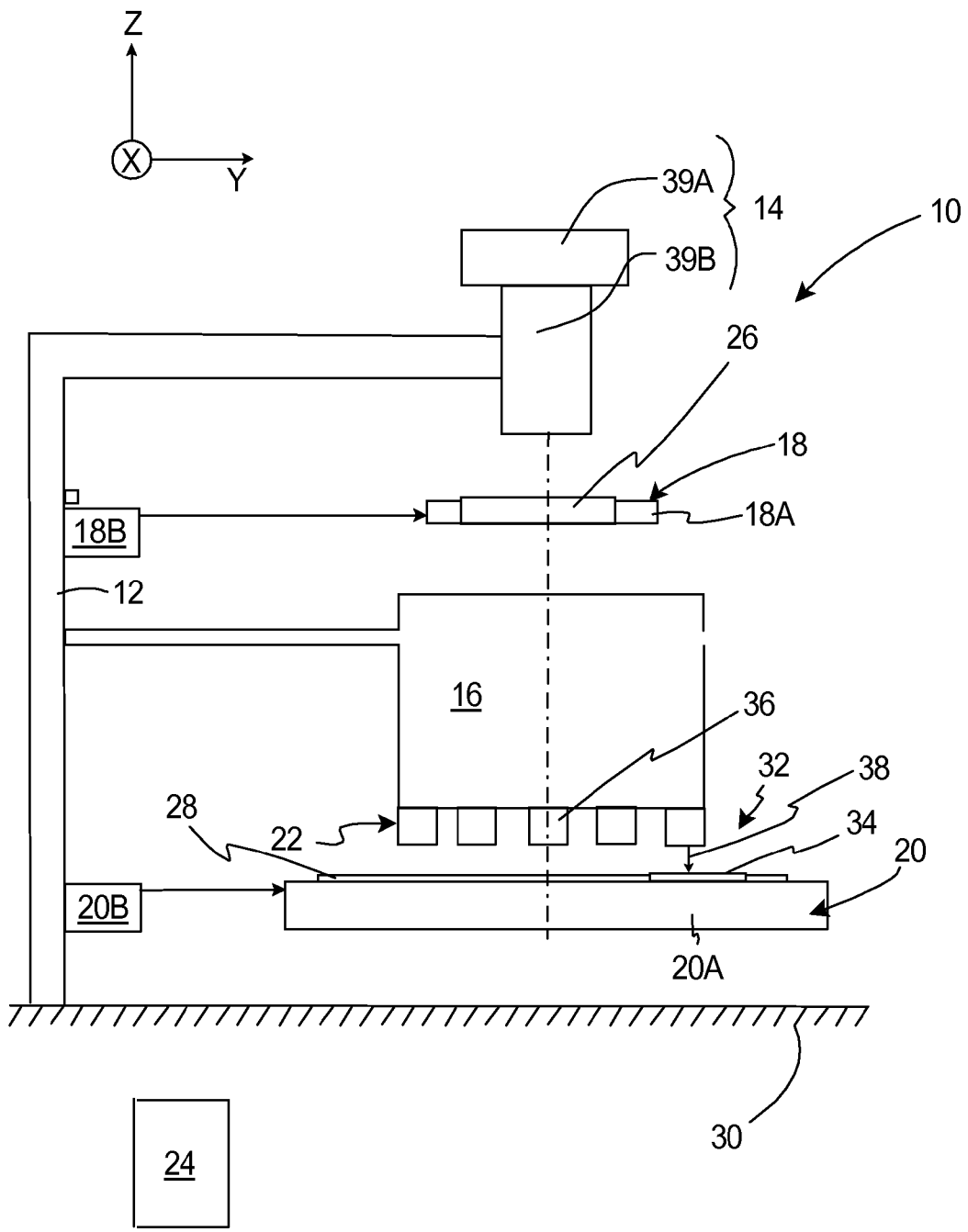
FIG. 1 is a schematic illustration of an exposure apparatus having features of the present invention.

FIG. 1 is a schematic illustration of a precision assembly, namely an exposure apparatus 10 having features of the present invention. The exposure apparatus 10 includes an apparatus frame 12, an illumination system 14 (irradiation apparatus), an optical assembly 16, a reticle stage assembly 18, a wafer stage assembly 20, a measurement system 22, and a control system 24. The design of the components of the exposure apparatus 10 can be varied to suit the design requirements of the exposure apparatus 10.

A number of Figures include an orientation system that illustrates an X axis, a Y axis that is orthogonal to the X axis, and a Z axis that is orthogonal to the X and Y axes. It should be noted that any of these axes can also be referred to as the first, second, and/or third axes.

The exposure apparatus 10 is particularly useful as a lithographic device that transfers a pattern (not shown) of an integrated circuit from a reticle 26 onto a semiconductor wafer 28. The exposure apparatus 10 mounts to a mounting base 30, e.g., the ground, a base, or floor or some other supporting structure.

As an overview, the measurement system 22 includes an encoder assembly 32 that measures relative movement of a first object and a second object, the first object and the second object being movable relative to each other. For example, the measurement system 22 can measure the position of a work piece (the first object), e.g. the wafer 28 relative to a reference (the second object) e.g. the optical assembly 16, with improved accuracy. In this embodiment, the work piece is moved relative to the reference.

In one embodiment, the encoder assembly 32 can be designed to monitor the position and/or relative movement of the work piece 28 along three axes (along the X, Y, and Z axes) and about one axis (theta X) relative to the reference. In FIG. 1, the encoder assembly 32 includes a measurement grating 34 that is secured to a top of a stage, e.g., a wafer stage 20A, that retains the work piece 28, and one or more fixed encoder heads 36 that are secured to the optical assembly 16 to monitor the position of the work piece 28. In this embodiment, each encoder head 36 directs one or more measurement beams 38 (only one is illustrated in FIG. 1) toward the stage 20A and/or toward the measurement grating 34 that is secured to the stage 20A. Alternatively, for example, the one or more encoder heads 36 can be mounted on the wafer stage 20A, and the measurement grating 34 can be mounted to the optical assembly 16.

Moreover, as described in detail herein below, the measurement beams 38 are adjusted within the encoder heads 36 so that the measurement beams 38 have a substantially oval cross-sectional shape when the measurement beams 38 are directed toward the stage 20A and/or toward the measurement grating 34 by the encoder heads 36.

In this embodiment, each encoder head 36 can be used to monitor the position of the work piece 28 along three axes (along the X, Y, and Z axes) and about one axis (theta X) when the measurement grating 34 is positioned below it. Thus, as the stage 20A and the measurement grating 34 are moved relative to the encoder heads 36, the encoder head 36 positioned above the measurement grating 34 will be used to monitor the position.

Figure 4:
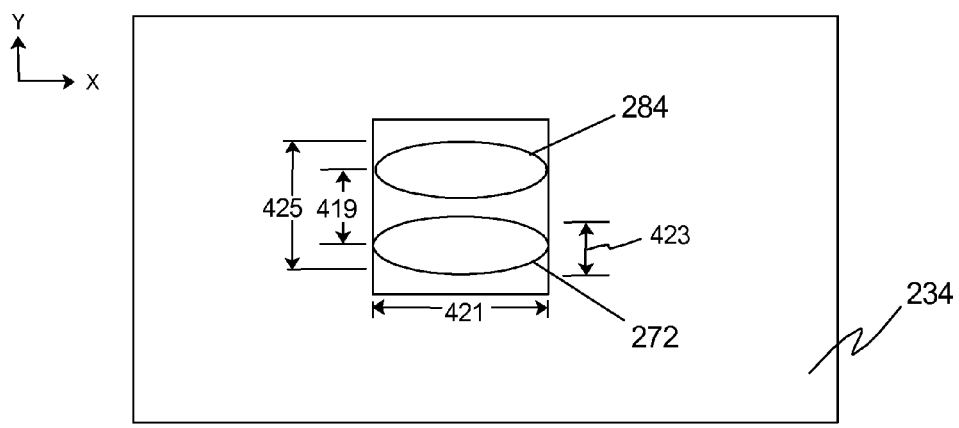
FIG. 4 illustrates two measurement beams having features of the present invention as incident on the grating, nominal positions.

The number of encoder heads 36 can be varied according to the design of the system and the amount of travel of the stage 20A. It should be noted that the five encoder heads 36 illustrated in FIG. 1 is just an example, and the actual number of encoder heads 36 can be greater than or fewer than five. For example, the encoder assembly 32 can include fourteen encoder heads 36 mounted in a line to measure a large distance of the stage along the Y axis. Additionally, it should be noted that the use of multiple encoder heads 36 enables the encoder assembly 32 to more accurately measure the position of the grating 34, and thus the position of the work piece 28 that is retained by the stage 20A, due to the stage 20A and the grating 34 moving relative to the encoder heads 36. As provided herein, to effectively switch between encoder heads 36, the footprint of the measurement beams 38 needs to be small. The approximate size of one, non-exclusive embodiment of the footprint for the disclosed design is shown in FIG. 4 and described below.

Moreover, as provided herein, in certain embodiments, the encoder assembly 32 enables such features as: (i) improved light efficiency; (ii) improved contrast (i.e. contrast loss due to shear of the measurement beams as the grating 34 moves along the z-axis 38 is inhibited); (iii) a relatively small encoder head footprint; (iv) a relatively small measurement beam footprint; (v) inhibiting of cyclic non-linear error (CNLE), or stray light rejection; (vi) zero dead path (where dead path is the difference in path length in air and glass traversed by the measurement and reference beams); (vii) minimal non-common path (where non-common path describes the reference beam paths taking place in air or glass far from or independent of the measurement beam); and (viii) a small number of components, such that the components should be easy to align. As a result thereof, encoder heads 36 can be more easily fabricated, the wafer 28 can be positioned with improved accuracy, and the exposure apparatus 10 can be used to manufacture higher density wafers 28.

There are a number of different types of lithographic devices. For example, the exposure apparatus 10 can be used as a scanning type photolithography system that exposes the pattern from the reticle 26 onto the wafer 28 with the reticle 26 and the wafer 28 moving synchronously. Alternatively, the exposure apparatus 10 can be a step-and-repeat type photolithography system that exposes the reticle 26 while the reticle 26 and the wafer 28 are stationary. However, the use of the exposure apparatus 10 provided herein is not limited to a photolithography system for semiconductor manufacturing. The exposure apparatus 10, for example, can be used as an LCD photolithography system that exposes a liquid crystal display device pattern onto a rectangular glass plate or a photolithography system for manufacturing a thin film magnetic head.

The apparatus frame 12 is rigid and supports the components of the exposure apparatus 10. The apparatus frame 12 illustrated in FIG. 1 supports the reticle stage assembly 18, the optical assembly 16, the wafer stage assembly 20, and the illumination system 14 above the mounting base 30.

The illumination system 14 includes an illumination source 39A and an illumination optical assembly 39B. The illumination source 39A emits a beam (irradiation) of light energy. The illumination optical assembly 39B guides the beam of light energy from the illumination source 39A to the optical assembly 16. The beam of light energy selectively illuminates different portions of the reticle 26 and exposes the wafer 28.

The illumination source 39A can be a g-line source (436 nm), an i-line source (365 nm), a KrF excimer laser (248 nm), an ArF excimer laser (193 nm), a $F_2$ laser (157 nm), or an EUV source (13.5 nm). Alternatively, the illumination source 39A can generate charged particle beams such as an x-ray or an electron beam. For instance, in the case where an electron beam is used, thermionic emission type lanthanum hexaboride ($LaB_6$) or tantalum (Ta) can be used as a cathode for an electron gun. Furthermore, in the case where an electron beam is used, the structure could be such that either a mask is used or a pattern can be directly formed on a substrate without the use of a mask.

The optical assembly 16 projects and/or focuses the light passing through the reticle 26 to the wafer 28. Depending upon the design of the exposure apparatus 10, the optical assembly 16 can magnify or reduce the image illuminated on the reticle 26. The optical assembly 16 need not be limited to a reduction system. It could also be a 1× or magnification system.

The reticle stage assembly 18 holds and positions the reticle 26 relative to the optical assembly 16 and the wafer 28. In FIG. 1, the reticle stage assembly 18 includes a reticle stage 18A that retains the reticle 26, and a reticle stage mover assembly 18B that positions the reticle stage 18A and the reticle 26. The reticle stage mover assembly 18B can be designed to move the reticle 26 along the X, Y and Z axes, and about the X, Y and Z axes.

Somewhat similarly, the wafer stage assembly 20 holds and positions the wafer 28 with respect to the projected image of the illuminated portions of the reticle 26. In FIG. 1, the wafer stage assembly 20 includes the wafer stage 20A that retains the wafer 28, and a wafer stage mover assembly 20B that positions the wafer stage 20A and the wafer 28. The wafer stage mover assembly 20B can be designed to move the wafer 28 along the X, Y and Z axes, and about the X, Y and Z axes. In this embodiment, the wafer 28 can be scanned while the wafer stage assembly 20 moves the wafer 28 along the Y axis. In FIG. 1, the measurement grating 34 is fixedly secured to the top of the wafer stage 20A.

The measurement system 22 monitors movement of the reticle 26 and the wafer 28 relative to the optical assembly 16 or some other reference. With this information, the control system 24 can control the reticle stage assembly 18 to precisely position the reticle 26 and the wafer stage assembly 20 to precisely position the wafer 28. For example, the measurement system 22 can utilize multiple laser interferometers, encoders, autofocus systems, and/or other measuring devices in addition to the encoder assembly 32.

The control system 24 is connected to the reticle stage assembly 18, the wafer stage assembly 20, and the measurement system 22. The control system 24 receives information from the measurement system 22 and controls the stage assemblies 18, 20 to precisely position the reticle 26 and the wafer 28. The control system 24 can include one or more processors and circuits.

Figure 2A:
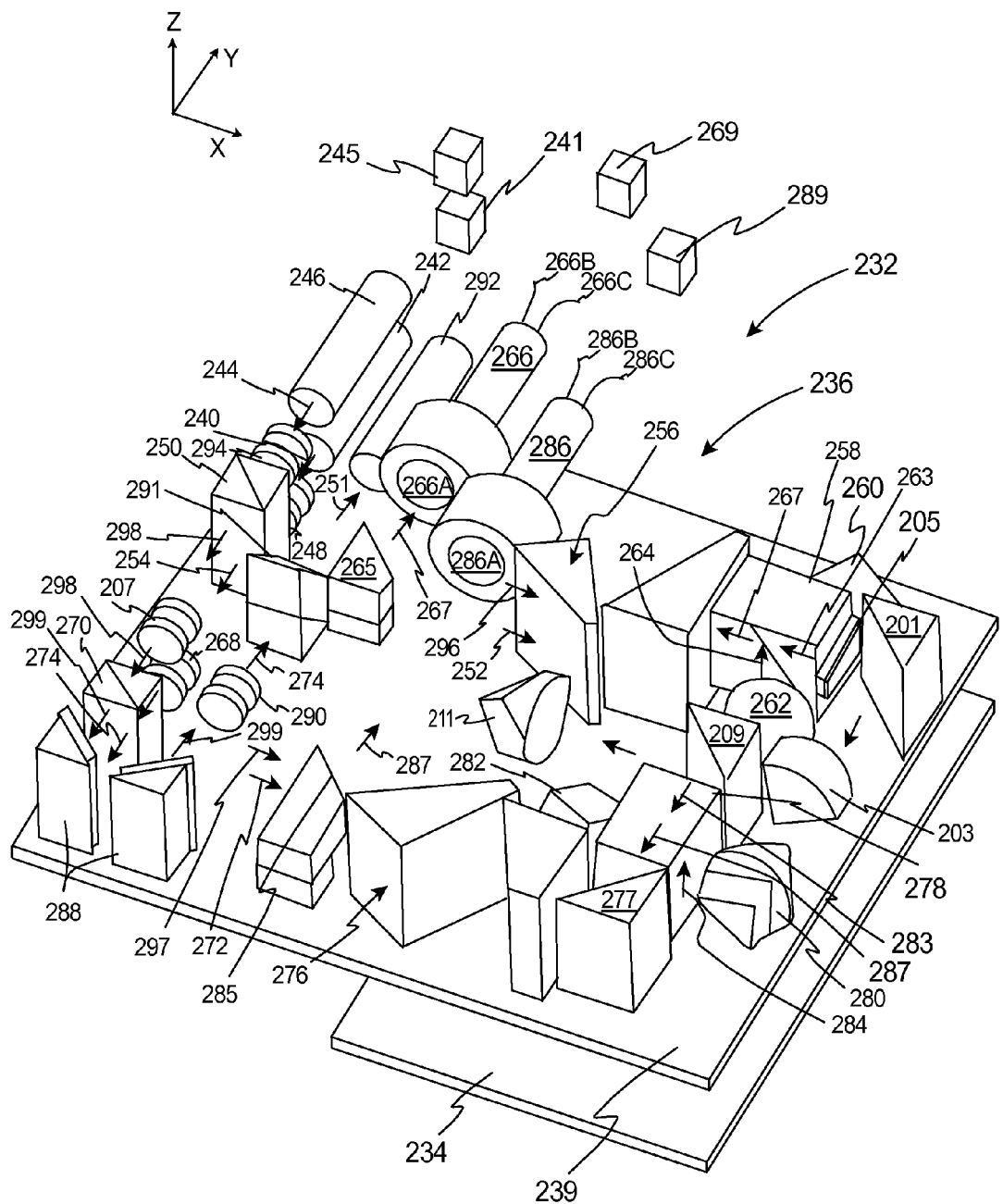
FIG. 2A is a simplified perspective view of a portion of an encoder assembly including a measurement grating and an encoder head having features of the present invention.

FIG. 2A is a simplified perspective view of a portion of an encoder assembly 232 having features of the present invention. More particularly, FIG. 2A is a simplified perspective view of a portion of a measurement grating 234 and an embodiment of an encoder head 236 having features of the present invention. As provided herein, in the embodiment illustrated in FIG. 2A, the encoder head 236 directs two, first pass measurement beams at the measurement grating 234 to monitor the position of the measurement grating 234 along three axes (along the X, Y, and Z axes) and about one axis (theta X). In this example, one of the first pass measurement beams is used to monitor the position of the measurement grating 234 along the Y and Z axes, and the other first pass measurement beam is used to monitor the position of the measurement grating 234 along the X and Z axes. Alternatively, for example, the encoder head 236 can be designed to direct a single, first pass measurement beam at the grating 234 to monitor the position of the measurement grating 234 along two axes, or the encoder head 236 can direct more than two first pass measurement beams at the measurement grating 234.

In one embodiment, the measurement grating 234 is a two dimensional grating that includes two sets of parallel lines (not shown) that run substantially perpendicular to one another in a checkerboard-like manner on a plate that is attached to the top of the stage, e.g., the wafer stage 20A (illustrated in FIG. 1), and further includes either a set of round or square pedestals (not shown in FIG. 2A) that rise from the plate, or a set of round or square holes (not shown in FIG. 2A) found in the plate. Alternatively, the measurement grating 234 can have a different design. For example, in one embodiment, the measurement grating 234 can be a one-dimensional grating (a grating with parallel lines running in one direction). Additionally, in one non-exclusive embodiment, the grating 234 has a period of approximately one or two microns.

In FIG. 2A, the encoder head 236 includes an encoder body 239 that retains the other components of the encoder head 236. In certain embodiments, the encoder body 239 can be a substantially rectangular glass plate. Additionally, in one such embodiment, the encoder body 239, i.e. the glass plate, can have holes in it to allow the beams of light to reach the measurement grating 234 without traveling through the glass. Alternatively, the encoder body 239 can be made from another suitable material.

In one embodiment, (i) the encoder head 236 receives an input measurement beam 240 from a measurement light source 241 via a measurement input fiber 242 that launches the input measurement beam 240 along the Y axis; and (ii) the encoder head 236 receives an input reference beam 244 from a reference light source 245 via a reference input fiber 246 that launches the input reference beam 244 along the Y axis. In FIG. 2A, the input reference beam 244 is launched parallel to the input measurement beam 240, and the beams 240, 244 are stacked vertically and spaced apart along the Z axis. In FIG. 2A, the input reference beam 244 is positioned above the input measurement beam 240 along the Z axis. Alternatively, the input measurement beam 240 can be positioned above the input reference beam 244, or the beams 240, 244 can be positioned in a different manner relative to one another.

Further, in this embodiment, each input beam 240, 244 has a substantially circular cross-section. As a non-exclusive embodiment, each input beam 240, 244 can be collimated and can have a diameter of approximately 1.75 millimeters.

In one embodiment, the measurement light source 241 generates the input measurement beam 240 that is at a measurement wavelength that is different from a reference wavelength of the input reference beam 244 generated by the reference light source 245. In one non-exclusive embodiment, the measurement wavelength of the measurement beam 240 is different from the reference wavelength of the input reference beam 244 by between approximately 10 MHz and 30 MHz. In one such embodiment, the reference frequency is different than the measurement frequency by approximately 20 MHz. Alternatively, the difference in frequencies can be greater than or less than the examples provided herein.

In one non-exclusive embodiment, one of the beams 240, 244 has a center wavelength of approximately 632 nanometers. For example, the measurement light source and/or the reference light source can be a heterodyne Helium-neon (HeNe) laser. In this embodiment, each frequency is delivered on a separate fiber 242, 246.

In FIG. 2A, the input measurement beam 240 exiting the measurement input fiber 242 is directed along the Y axis through a first pair of measurement Risley prisms 248 and subsequently at a first beam splitter 250 where the input measurement beam 240 is split into a first (YZ) measurement beam 252 (directed along the X axis) and a remainder measurement beam 254 (continuing along the Y axis).

As shown in this embodiment, the first measurement beam 252 is directed at a YZ beam shape adjuster 256 that changes the shape of the first measurement beam 252 from a substantially circular cross-sectional shape to a substantially oval cross-sectional shape. Next, the first measurement beam 252 is directed at a YZ module 258 which directs the first measurement beam 252 downward along the Z axis at the measurement grating 234.

In certain embodiments, the measurement grating 234 acts somewhat like a beam splitter that causes (i) a −1 order YZ measurement beam to be directed upwards towards a first YZ redirector 260 mounted on the encoder body 239, and (ii) a +1 order YZ measurement beam to be directed upward towards a second YZ redirector 262 mounted on the encoder body 239. Because both the +1 and −1 order YZ measurement beams are used, the light efficiency is improved by a factor of two. Each YZ redirector 260, 262 can be a corner cube that redirects the respective beam back at the measurement grating 234. The measurement grating 234 then directs the two YZ measurement beams 264 (illustrated as a single arrow) back at the YZ module 258.

Subsequently, the YZ module 258 redirects the +1 and −1 order YZ measurement beams 264 along the X axis. In the YZ module 258, as described below, the +1 and −1 order YZ measurement beams 264 are combined with +1 and −1 order YZ reference beams 263 (illustrated as a single arrow) to form a pair of YZ interfering beams 267 (illustrated as a single arrow). More specifically, (i) the +1 order YZ measurement beam 264 is combined with the +1 order YZ reference beam 263 in the YZ module 258 to form the +1 order YZ interfering beam 267, and (ii) the −1 order YZ measurement beam 264 is combined with the −1 order YZ reference beam 263 in the YZ module 258 to form the −1 order YZ interfering beam 267.

The YZ interfering beams 267 are directed along the X axis back at the YZ beam shape adjuster 256, which changes the shape of each of the YZ interfering beams 267 from a substantially oval cross-sectional shape to a substantially circular cross-sectional shape. Next, the two YZ interfering beams 267 are directed at a YZ director 265 (e.g., a fold mirror) that directs the two YZ interfering beams 267 along the Y axis at a YZ output 266. As illustrated, the YZ output 266 can include a lens 266A that focuses (i) the +1 order YZ interfering beam 267 onto a fiber facet of a first YZ fiber 266B, and (ii) the −1 order YZ interfering beam 267 onto a fiber facet of a second YZ fiber 266C.

Subsequently, the +1 and −1 order YZ interfering beams 267 are transferred via the fibers 266B, 266C to a detector 269 for processing of the measurement signals to determine the position of the measurement grating 234 relative to the encoder head 236 along the Y axis and along the Z axis. In certain embodiments, the change in phase of the interfering beams 267 can be used to determine the position of the measurement grating 234 along the Y axis and along the Z axis.

In FIG. 2A, the remainder measurement beam 254 exiting the first beam splitter 250 is directed along the Y axis through a second pair of Risley prisms 268 to a second beam splitter 270 where it is split into a second (XZ) measurement beam 272 (directed along the X axis) and a continuing measurement beam 274 (continuing along the Y axis). The second measurement beam 272 is directed at a XZ beam shape adjuster 276 that changes the shape of the second measurement beam 272 from a substantially circular cross-sectional shape to a substantially oval cross-sectional shape. Next, the second measurement beam 272 is directed at a XZ director 277 (e.g., a fold mirror or prism) that directs the second measurement beam 272 along the Y axis at a XZ module 278 which directs the second measurement beam 272 along the Z axis at the measurement grating 234.

In this embodiment, the measurement grating 234 again acts somewhat like a beam splitter that causes (i) a +1 order XZ measurement beam to be directed upwards towards a first XZ redirector 280 mounted on the encoder body 239, and (ii) a −1 order XZ measurement beam to be directed upward towards a second XZ redirector 282 mounted on the encoder body 239. Because both the +1 and −1 order XZ measurement beams are used, the light efficiency is improved by a factor of two. Each XZ redirector 280, 282 can be a corner cube that redirects the respective beam back at the measurement grating 234. The measurement grating 234 then directs the two XZ measurement beams 284 (illustrated as a single arrow) back at the XZ module 278.

Subsequently, the XZ module 278 redirects the +1 and −1 order XZ measurement beams 284 along the Y axis. In the XZ module 278, the +1 and −1 order XZ measurement beams 284 are combined with +1 and −1 order XZ reference beams 283 (illustrated as a single arrow) to form a pair of XZ interfering beams 287 (illustrated as a single arrow). More specifically, (i) the +1 order XZ measurement beam 284 is combined with the +1 order XZ reference beam 283 in the XZ module 278 to form the +1 order XZ interfering beam 287, and (ii) the −1 order XZ measurement beam 284 is combined with the −1 order XZ reference beam 283 in the XZ module 278 to form the −1 order XZ interfering beam 287.

The XZ interfering beams 287 are directed along the Y axis at the XZ director 277 where they are redirected along the X axis back at the XZ beam shape adjuster 276, which changes the shape of each of the XZ interfering beams 287 from a substantially oval cross-sectional shape to a substantially circular cross-sectional shape. Next, the two XZ interfering beams 287 are directed at a XZ director 285 (e.g., a fold mirror or prism) that directs the two XZ interfering beams 287 substantially along the Y axis at a XZ output 286. As illustrated, the XZ output 286 can include a lens 286A that focuses (i) the +1 order XZ interfering beam 287 onto a fiber facet of a first XZ fiber 286B, and (ii) the −1 order XZ interfering beam 287 onto a fiber facet of a second XZ fiber 286C.

Subsequently, the +1 and −1 order XZ interfering beams 287 are transferred via the fibers 286B, 286C to a detector 289 for processing of the measurement signals to determine the position of the measurement grating 234 relative to the encoder head 236 along the X axis and along the Z axis. In certain embodiments, the change in phase of the interfering beams 287 can be used to determine the position of the measurement grating 234 along the X axis and along the Z axis.

Further, because the position of the measurement grating 234 along the Z axis is determined at two locations (one with the YZ interfering beams 267 and one with the XZ interfering beams 287) spaced apart along the Y axis, the rotational position of the measurement grating 234 about the X axis can also be monitored.

The continuing measurement beam 274 that exits the second beam splitter 270 along the Y axis is directed at a redirector 288 (e.g., a pair of fold mirrors) that redirects the continuing measurement beam 274 back along the Y axis in a different direction, through a third pair of Risley prisms 290 and a beam combiner 291 at a reference output 292.

In FIG. 2A, the input reference beam 244 exiting the reference input fiber 246 is directed along the Y axis through a pair of reference Risley prisms 294 and subsequently at the first beam splitter 250 where it is split into a first (YZ) reference beam 296 (directed along the X axis) and a remaining reference beam 298 (continuing along the Y axis). The first reference beam 296 is directed at the YZ beam shape adjuster 256 that changes the shape of the first reference beam 296 from a substantially circular cross-sectional shape to a substantially oval cross-sectional shape. Next, the first reference beam 296 travels through the YZ module 258 and impinges on a YZ director 201 (e.g., a fold mirror or prism) that directs the first reference beam 296 along the Y axis at a YZ reference redirector 203 (e.g., a corner cube). The YZ reference redirector 203 redirects the first reference beam 296 back along the Y axis at the YZ director 201 that directs the first reference beam 296 along the X axis back at the YZ module 258. At this time, the first reference beam 296 impinges on a YZ grating 205 that splits the first reference beam 296 into the +1 and −1 order YZ reference beams 263 that interfere with the +1 and −1 order YZ measurement beams 264 to form the +1 and −1 order YZ interfering beams 267. In one embodiment, the YZ grating 205 can be a one-dimensional grating (i.e. a grating with parallel lines running in one direction). Additionally, as discussed above, the YZ interfering beams 267 travel through the YZ beam shape adjuster 256, then reflect off the YZ director 265 at the YZ output 266.

The remaining reference beam 298 that exits the first beam splitter 250 along the Y axis travels through a pair of Risley prisms 207 and is directed at the second beam splitter 270 where it is split into a second (XZ) reference beam 297 (directed along the X axis) and a continuing reference beam 299 (continuing along the Y axis). The second reference beam 297 is directed at the XZ beam shape adjuster 276 that changes the shape of the second reference beam 297 from a substantially circular cross-sectional shape to a substantially oval cross-sectional shape. Next, the second reference beam 297 is directed along the Y axis with the XZ director 277 and subsequently travels through the XZ module 278 and impinges on an XZ director 209 (e.g., a fold mirror) that directs the reference beam 297 along the X axis at a XZ reference redirector 211 (e.g., a corner cube). The XZ reference redirector 211 redirects the beam 297 back along the X axis at the XZ director 209 that directs the beam 297 along the Y axis back at the XZ module 278. At this time, the second reference beam 297 impinges on an XZ grating 207 (illustrated in FIG. 2B) that splits the second reference beam 297 into the +1 order and −1 order XZ reference beams 283 that interfere with the +1 order and −1 order XZ measurement beams 284 to form the +1 order and −1 order XZ interfering beams 287. Subsequently, the XZ interfering beams 287 are reflected along the X axis with the XZ director 277 at the XZ beam shape adjuster 276, and then reflected off the XZ director 285 at the XZ output 286.

In one embodiment, the YZ grating 205 and/or the XZ grating 207 (also referred to as the "reference gratings") can be a one-dimensional grating (i.e. a grating with parallel lines running in one direction). Alternatively, one or both of the YZ grating 205 and the XZ grating 207 can have a different design. For example, the grating 205 can be a blazed grating that splits the light equally into the +1 and 0 order. In this design, the blazed grating can be positioned on a substrate that is wedged such that the 0-order beam is at an angle such that it is parallel to the −1 order measurement beam. In certain embodiments, the grating pitch of this blazed grating can be approximately twice that of the normal incidence reference grating, that creates a +1 and −1 order.

The continuing reference beam 299 that exits the second beam splitter 270 along the Y axis is directed at the redirector 288 (e.g., the pair of fold mirrors) that redirect the continuing reference beam 299 back along the Y axis in a different direction, and through the beam combiner 291 where it is combined with the continuing measurement beam 274 to create a combined beam 251 that is directed at a reference output 292. The signal from the reference output 292 is used to detect if there is any change in the input beams 240, 244, for example from path length changes in the two delivery fibers.

It should be noted that the Risley prisms, as illustrated and described herein, are used to adjust the angles of the respective beams to compensate for alignment errors in the components.

Figure 2B:
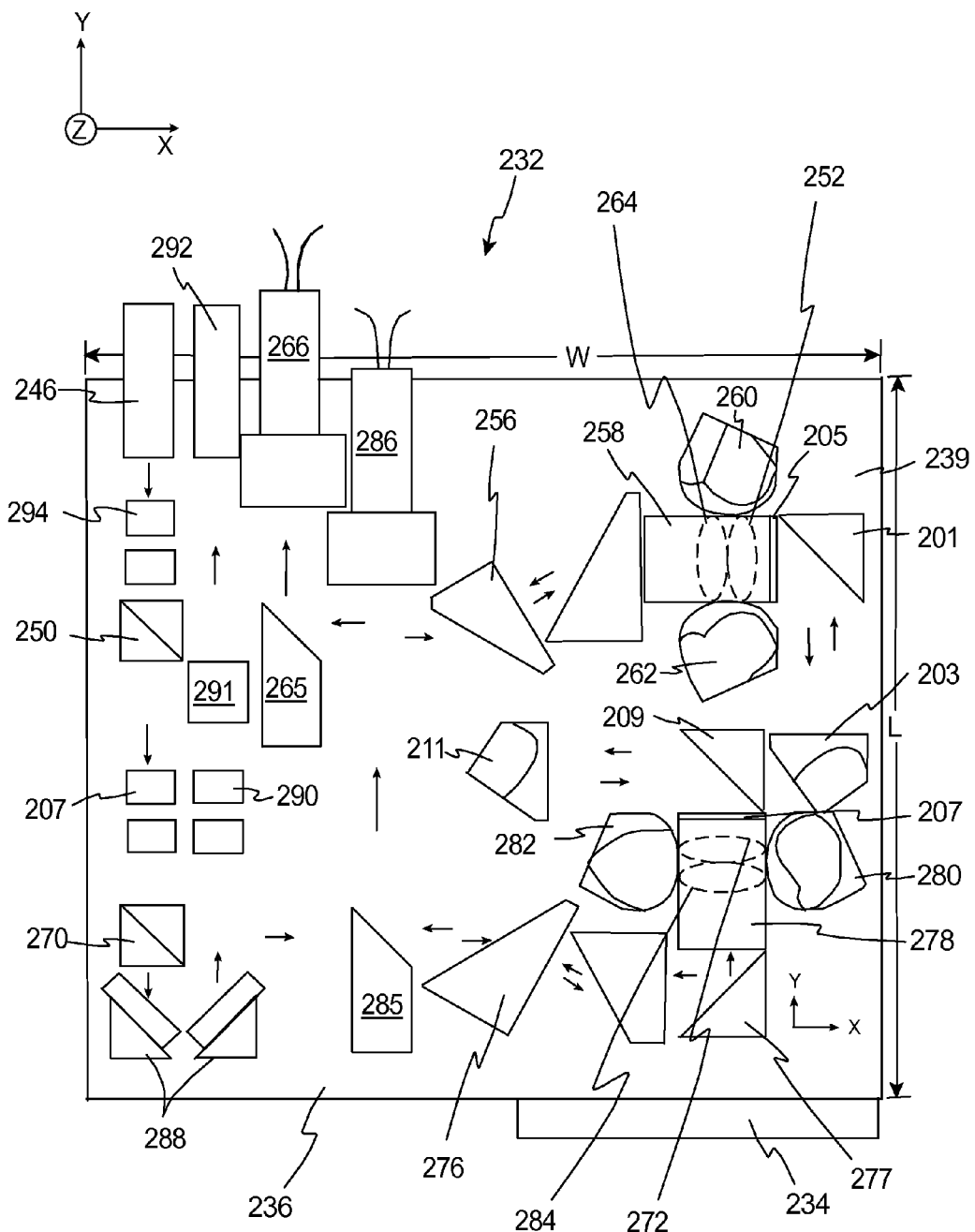
FIG. 2B is a top view of a portion of the encoder assembly shown in FIG. 2A.

FIG. 2B is a top view of a portion of the encoder assembly 232 shown in FIG. 2A. In particular, FIG. 2B is a top view of the measurement grating 234 and the encoder head 236 shown in FIG. 2A, including the reference input fiber 246; pairs of Risley prisms 294, 207, 290; the beam splitters 250, 270; the YZ beam shape adjuster 256; the YZ module 258; the YZ redirectors 260, 262; the YZ director 265; the YZ output 266; the XZ beam shape adjuster 276; the XZ director 277; the XZ module 278; the XZ redirector 280, 282; a XZ director 285; the XZ output 286; the redirector 288; the beam combiner 291, the reference output 292, the YZ director 201; the YZ reference redirector 203; the YZ grating 205; the XZ director 277; the XZ director 209; the XZ reference redirector 211; the XZ grating 207, and the beam combiner 291.

Additionally, FIG. 2B illustrates the directing of the beams above the encoder body 239. Moreover, FIG. 2B illustrates that (i) the first (YZ) measurement beam 252 (i.e. the first pass YZ measurement beam) that is directed onto the measurement grating 234 is oval shaped, (ii) the +1 and −1 order YZ measurement beams 264 (i.e. the second pass YZ measurement beams, illustrated as a single oval because they are overlapping on the measurement grating 234) are oval shaped, (iii) the second (XZ) measurement beam 272 (i.e. the first pass XZ measurement beam) that is directed onto the measurement grating 234 is oval shaped, and (iv) the +1 and −1 order XZ measurement beams 284 (i.e. the second pass XZ measurement beams, illustrated as a single oval because they are overlapping on the measurement grating 234) are oval shaped.

Moreover, in one non-exclusive embodiment, the encoder body 239 can be substantially rectangular-shaped, having a length L of approximately 65.0 millimeters and a width W of approximately 59.0 millimeters. Alternatively, the encoder body 239 can be designed to have a different size and/or shape. For example, the encoder body 239 can have a length that is greater than or less than approximately 65.0 millimeters, and/or the encoder body 239 can have a width that is greater than or less than approximately 59.0 millimeters.

Referring to FIGS. 2A and 2B, it should be noted that with the encoder head designs provided herein, the YZ director 201, the YZ reference redirector 203, the XZ director 209, and the XZ reference redirector 211 are positioned so that (i) the length of travel of the YZ measurement beams (i.e. the first measurement beam 252 and the +1 and −1 order YZ measurement beams 264) is approximately equal to the length of travel of the YZ reference beams (i.e. the first reference beam 296 and the +1 and −1 order YZ reference beams 263) so there is approximately zero dead path; (ii) the length of travel of the XZ measurement beams (i.e. the second measurement beam 272 and the +1 and −1 order XZ measurement beams 284) is approximately equal to the length of travel of the XZ reference beams (i.e. the second reference beam 297 and the +1 and −1 order XZ reference beams 283) so there is approximately zero dead path; (iii) the reference beam (i.e. the continuing reference beam 299, which is combined with the continuing measurement beam 274) that goes into the reference output 292 also has zero dead path, (iv) the matching of the air and glass paths for all 5 interferometer signals, i.e. the design to include zero dead paths as provided above, minimizes thermal instabilities, thus allowing the use of the high powered, but with reduced frequency stability, heterodyne HeNe lasers in certain embodiments; (v) there is minimal non-common path between the YZ measurement beams and the YZ reference beams; (vi) there is minimal non-common path between the XZ measurement beams and the XZ reference beams; and (vii) there is a relatively small number of components, such that these components should be relatively easy to align. Moreover, in certain embodiments, the paths taken by the measurement beams and the reference beams when they are separated are about 60 millimeters total, primarily in air, which is nearly the minimum possible given the design constraints. This will minimize errors due to thermal gradients.

Further, it should be noted that the encoder head designs provided herein are merely schematic and are just meant to show the use of both the +1 and −1 beams, and not the actual design of the encoder head 236.

One issue with the design of the encoder assembly 232 provided herein is the potential contrast loss over a Z travel range of +/−1 millimeter of the measurement grating 234 relative to the encoder head 236. This potential contrast loss is due to shear of the measurement beams 264, 284. Additionally, due to package size constraints, it can be difficult to satisfy all other requirements with a beam much larger than 2.0 millimeters. However, as provided herein, one way to counteract the shear is to increase the diameter of each measurement beam 264, 284 in the direction of shear so that the shear is a smaller fraction of the beam diameter. For example, in one embodiment, the present invention utilizes oval shaped measurement beams 264, 284 that are directed at the measurement grating 234 to counteract the contrast loss by being wider in the direction of shear, while still maintaining a relatively small beam footprint.

Figure 3A:
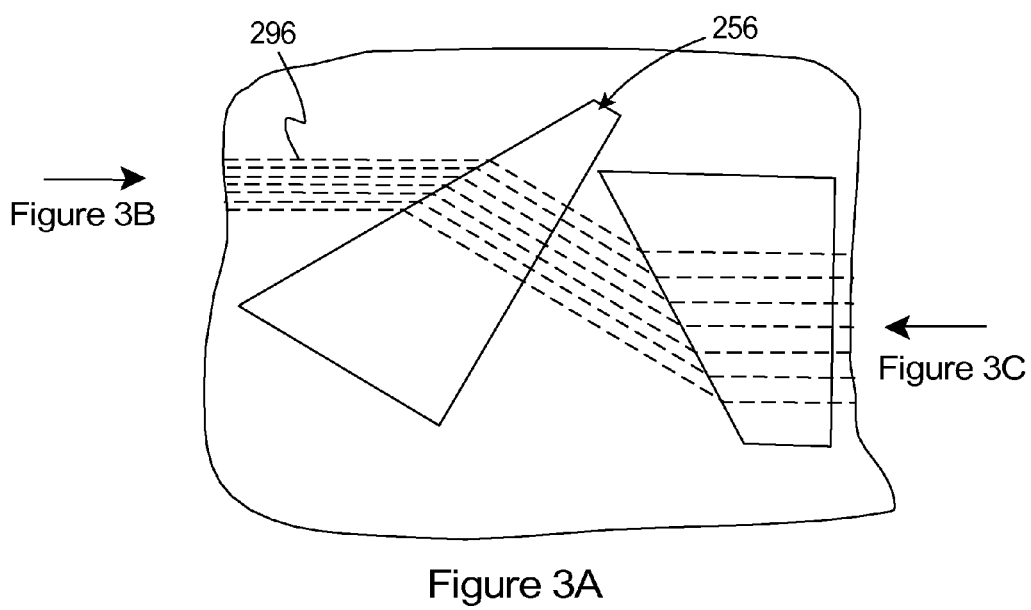
FIG. 3A is a simplified top view of a beam shape adjuster having features of the present invention.

FIG. 3A is a simplified top view of the YZ beam shape adjuster 256 that can be used in the embodiment illustrated in FIG. 2A. It should be noted that this same design can be used as the XZ beam shape adjuster 276 in FIG. 2A. In this embodiment, the YZ beam shape adjuster 256 includes an Anamorphic prism pair that expands the first (YZ) reference beam 296 and the first (YZ) measurement beam 252 (not shown in FIG. 3A) that travel from left to right through the prism pair from a beam with a circular shaped cross-section to a beam with an oval shaped cross-section. In certain embodiments, the beams 252, 296 entering the beam shape adjuster 256 have a circular cross-section, with a diameter of between approximately 1.50 and 2.00 millimeters; and the beams 252, 296 exiting the beam shape adjuster 256 have an oval cross-section, with a short dimension of between approximately 1.50 and 2.00 millimeters and a long dimension of between approximately 4.00 and 6.00 millimeters. For example, in one non-exclusive embodiment, the beams 252, 296 entering the beam shape adjuster 256 have a circular cross-section, with a diameter of about 1.75 millimeters; and the beams 252, 296 exiting the beam shape adjuster 256 have an oval cross-section, with a short dimension of approximately 1.75 millimeters and a long dimension of approximately 5.00 millimeters.

Further, the YZ beam shape adjuster 256 contracts the +1 order YZ interfering beam 267A (not shown in FIG. 3A), and the −1 order YZ interfering beam 267B (not shown in FIG. 3A) that travel from right to left through the prism pair from beams with an oval shaped cross-section, to beams with a circular shaped cross-section. In certain embodiments, the beams 267A, 267B entering the beam shape adjuster 256 from the right have an oval cross-section, with a short dimension of between approximately 1.50 and 2.00 millimeters and a long dimension of between approximately 4.00 and 6.00 millimeters; and the beams 267A, 267B exiting the beam shape adjuster 256 have a circular cross-section, with a diameter of between approximately 1.50 and 2.00 millimeters. For example, in one non-exclusive embodiment, the beams 267A, 267B entering the beam shape adjuster 256 from the right have an oval cross-section, with a short dimension of approximately 1.75 millimeters and a long dimension of approximately 5.00 millimeters; and the beams 267A, 267B exiting the beam shape adjuster 256 have a circular cross-section, with a diameter of about 1.75 millimeters. Stated in another fashion, the combined reference and measurement beams go back through the anamorphic prism pair and are reduced back to 1.75 millimeter diameter beams.

It should be noted that in this design, the relative positioning of the prisms in the prism pairs can be adjusted to adjust the shape (e.g., stretch) of the beams. Alternatively, a cylindrical lens pair, or another type of device can be used instead of the prism pair.

With the present design, the beams are large only where necessary (i.e. when they are incident on the measurement grating 234 (illustrated in FIG. 2A)); and they are small for all of the beam steering and beamsplitting required in the encoder head 236, thus enabling the overall size of the encoder head 236 to remain relatively small.

As provided herein, with the oval shaped beams, the encoder head 236 is more stable and more accurate over a larger range of measurement. More specifically, when the stage, e.g., the wafer stage 20A (illustrated in FIG. 1), is at a proper Z axis height, the beams perfectly overlap. As the position of the stage 20A along the Z axis changes there is less overlap and less contrast. With the use of oval shaped beams, the diameter of the beams is increased only in the direction of shear to provide more contrast, while minimizing the footprint of the beams on the measurement grating 234. Alternatively, a larger, circular beam would be harder to fit within a small encoder head package, and would have a larger footprint on the grating 234.

Figure 3B:
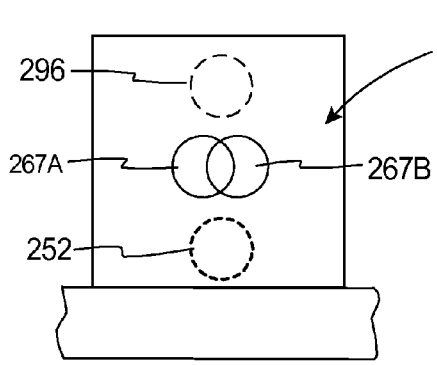
FIG. 3B is a simplified left side view of the beam shape adjuster shown in FIG. 3A.

FIG. 3B is a simplified left side view of the beam shape adjuster 256 shown in FIG. 3A. In particular, FIG. 3B illustrates that the first reference beam 296 and the first measurement beam 252 entering the beam shape adjuster 256 each have a circular shaped cross-section, while each of the +1 order YZ interfering beam 267A and the −1 order YZ interfering beam 267B exiting the beam shape adjuster 256 also have a circular shaped cross-section.

Figure 3C:
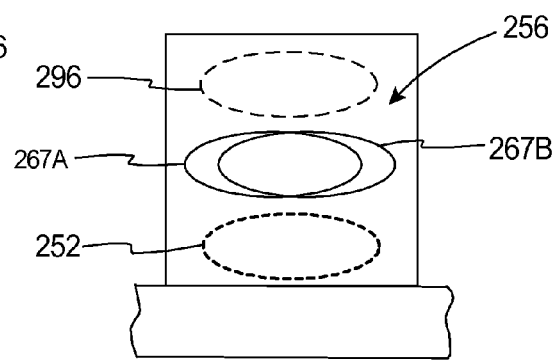
FIG. 3C is a simplified right side view of the beam shape adjuster shown in FIG. 3A.

FIG. 3C is a simplified right side view of the beam shape adjuster 256 shown in FIG. 3A. In particular, FIG. 3C illustrates that the first reference beam 296 and the first measurement beam 252 exiting the beam shape adjuster 256 each now have an oval shaped cross-section, while each of the +1 order YZ interfering beam 267A and the −1 order YZ interfering beam 267B entering the beam shape adjuster 256 also have an oval shaped cross-section.

Referring to both FIGS. 3B and 3C, it should be noted that the YZ interfering beams 267A, 267B are overlapping when they enter the adjuster 256 (illustrated in FIG. 3C). Further, the YZ interfering beams 267A, 267B are diverging relative to each other. As illustrated in FIG. 3B, the amount of overlap is decreased as the YZ interfering beams 267A, 267B travel through the beam shape adjuster 256. As provided herein, the beam shape adjuster 256 changes both the propagation angle and the shape of the YZ interfering beams 267A, 267B.

In one embodiment, it is desired to have a combined beam footprint requirement of approximately 5.0 by 5.0 millimeters square for each of the XZ and YZ modules. FIG. 4 illustrates the second (XZ) measurement beam 272 (i.e. the first pass XZ measurement beam) directed at the measurement grating 234, and the +1 order, and −1 order XZ measurement beams 284 (i.e. the second pass XZ measurement beams) directed at the measurement grating 234. It should be noted that the +1 order, and −1 order XZ measurement beams 284 are overlapping at the measurement grating 234.

The new design disclosed herein uses an oval beam to counteract contrast loss from shear and easily fits in the required package and beam footprint requirements. Additionally, as illustrated, the +1 order, and −1 order XZ measurement beams 284 have been shifted along the Y axis relative to the second (XZ) measurement beam 272. For example, in one non-exclusive embodiment, the +1 order, and −1 order XZ measurement beams 284 have been shifted a shift distance 419 along the Y axis relative to the second (XZ) measurement beam 272. In one non-exclusive example, the shift distance 419 is approximately 2.3 millimeters, or just slightly more than the width of the beams.

In certain embodiments, the measurement beam 272, 284 has a cross sectional shape at the measurement grating 234 with a first dimension 421 along a first direction and a second dimension 423 along a second direction that crosses the first direction, and the first dimension 421 is larger than the second dimension 423. Further, the two measurement beams 272, 284 can have a combined width 425.

As utilized herein, the term "oval" shall mean an ellipse-like shape. In certain, alternative, non-exclusive embodiments, the oval cross-sectional shape has a long dimension 421 that is at least approximately ten, fifteen, twenty, twenty-five, thirty, thirty-five, forty, forty-five, fifty, fifty-five, sixty, seventy, eighty, ninety, or one hundred percent greater than a short dimension 423 of the oval.

In one non-exclusive embodiment, each measurement beams 272, 284 has a second dimension 423 value of approximately 2.0 millimeters, and a first dimension value of approximately 5.0 millimeters. With this design, a total of four measurement beam passes (each beam approximately 2.0 by 5.0 millimeters) can fit within a 5.0 (first dimension 421) by 5.0 millimeters (combined width 425) beam footprint on the measurement grating 234 without introducing any CNLE.

Figure 5A:
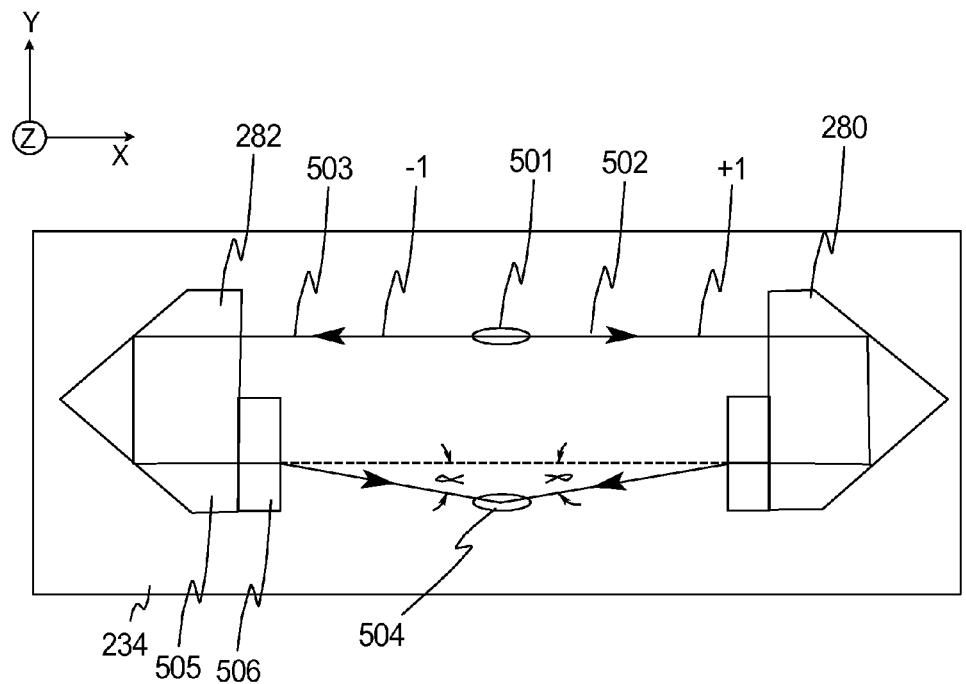
FIG. 5A is a simplified top illustration of the measurement grating and a pair of redirectors having features of the present invention.

FIG. 5A is a simplified top illustration of a pair of redirectors, e.g., the first XZ redirector 280 and the second XZ redirector 282 positioned over the measurement grating 234. It should be noted that YZ redirectors 260, 262 (illustrated in FIG. 2A) can be similar in design. In FIG. 5A, oval 501 denotes the footprint where the (first pass) XZ measurement beam is incident on the measurement grating 234. The beam 501 impinging on the measurement grating 234 creates a +1 order XZ measurement beam 502 directed at the first XZ redirector 280, and a −1 order XZ measurement beam 503 directed at the second XZ redirector 282. The first XZ redirector 280 redirects the +1 order XZ measurement beam back at the measurement grating 234, and the second XZ redirector 282 redirects the −1 order XZ measurement beam back at the measurement grating 234.

Additionally, in FIG. 5A, oval 504 denotes the footprint of where the +1 order (second pass) XZ measurement beam and the −1 order (second pass) XZ measurement beam are incident on the measurement grating 234. It should be noted that the +1 order (second pass) XZ measurement beam and the −1 order (second pass) XZ measurement beam are incident on the measurement grating 234 at the same location and are overlapping on the measurement grating 234 as illustrated by the single oval 504. Additionally, it should be noted that the (first pass) XZ measurement beam impinges on the measurement grating 234 (as illustrated by oval 501) at a different location along the Y axis than the +1 order (second pass) XZ measurement beam and the −1 order (second pass) XZ measurement beam are incident on the measurement grating 234 (as illustrated by oval 504). Further, it should be noted that the separation along the Y axis between oval 501 and 504 is exaggerated for clarity.

In some embodiments, each XZ redirector 280, 282 (and each YZ redirector) is an imperfect redirector, e.g., an imperfect corner cube. More specifically, in one such embodiment, each XZ redirector 280, 282 can include a perfect corner cube 505 and a small wedged glass plate 506 in front of the 'perfect' corner cube 505. With this design, the wedged glass plate 506 refracts the respective beam exiting the XZ redirector 280, 282 relative to the input beam in the XZ plane. Stated in another fashion, the wedged shaped glass plate 506 is designed to cause the respective XZ measurement beam that exits the XZ redirector 280, 282 to be displaced at an angle "α" relative to the XZ plane. As a result thereof, any 0-order light exiting from the measurement grating 234 will not cause cyclic non-linear error ("CNLE") because the first and second XZ redirectors 280, 282 refract the beam in the same direction (i.e. the second XZ redirector 282 traversed by the beam doesn't cancel out the off-axis angle of the first XZ redirector 280; it doubles it).

Figure 5B:
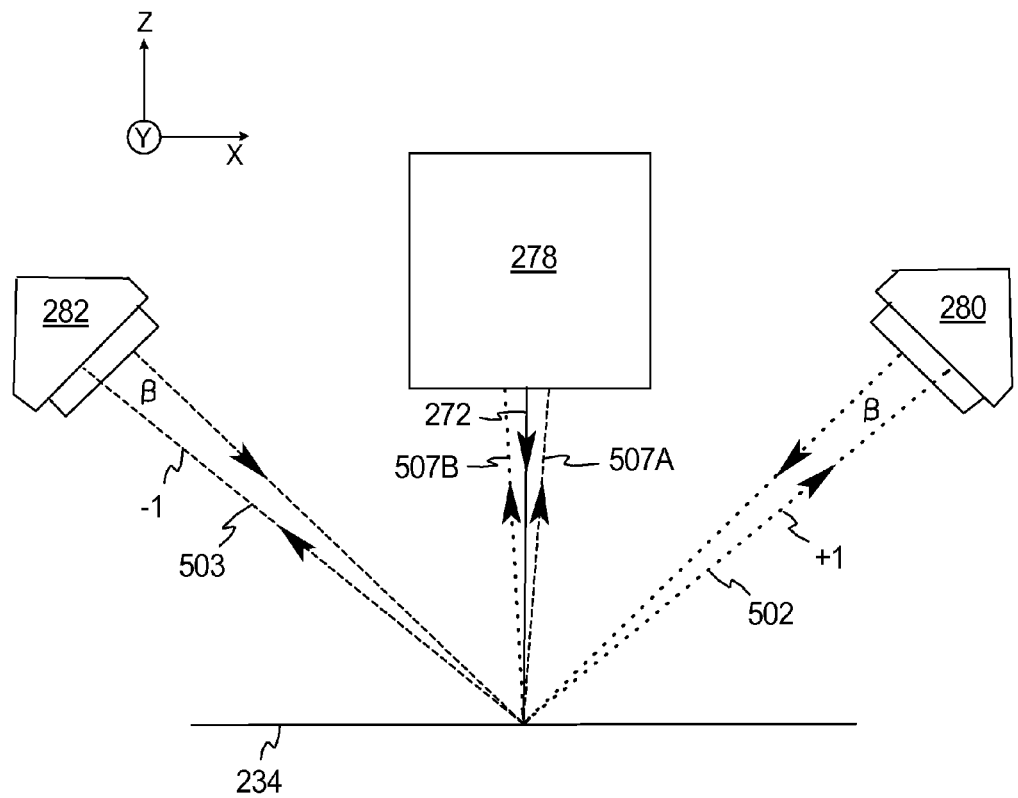
FIG. 5B is a simplified side illustration of the redirectors, a module, and the measurement grating having features of the present invention.

FIG. 5B is a simplified side illustration of the XZ redirectors 280, 282, the XZ module 278, and the grating 234. FIG. 5B illustrates that with the imperfect redirector, e.g., imperfect corner cube, design, the +1 order (second pass) XZ measurement beam exiting the first XZ redirector 280 is also at an angle "β" (instead of parallel with a perfect corner cube) in the XZ plane relative to the +1 order XZ measurement beam 502 entering the first XZ redirector 280. Somewhat similarly, the −1 order (second pass) XZ measurement beam exiting the second XZ redirector 282 is also at an angle "β" (instead of parallel with a perfect corner cube) in the XZ plane relative to the −1 order XZ measurement beam 503 entering the second XZ redirector 282. As a result thereof, (i) the +1 order XY measurement beam 507A is not parallel to the −1 order XY measurement beam 507B leaving the grating 234, and the first pass XY measurement beam 272 is not parallel to either the +1 order XY measurement beam 507A or the −1 order XY measurement beam 507B.

Referring to both FIGS. 5A and 5B, the "imperfect" XZ redirectors 280, 282 are designed so that a plane of incidence of the +1 order (second pass) XZ measurement beam on the measurement grating 234 is not parallel to a plane of incidence of the −1 order (second pass) XZ measurement beam on the measurement grating 234. It should be noted that the choice of direction offset angle is chosen so that stray light produced does not become parallel to the measurement paths. With this design, (i) the angles of incidence of the +1, −1 order beams (relative to the measurement grating) are different, and (ii) the planes of incidence of the +1, −1 order beams relative to the measurement grating 234 are not parallel. Choosing non-parallel planes of incidence of the +1, −1 order beams on the grating ($2^{nd}$ diffraction pass on grating) inhibits unwanted orders (zero and second order of light) of diffraction from entering the signal path. The plane of incidence is defined by the direction of beam and a normal to the measurement grating (two vectors define the plane of incidence.)

In one embodiment, the XZ redirectors 280, 282 are designed so that the +1 order (second pass) XZ measurement beam and the −1 order (second pass) XZ measurement beam overlap and impinge at the same location on the measurement grating 234. However, because of the angles "α" introduced by the "imperfect" XZ redirectors 280, 282, the angles of these beams on the measurement grating 234 are different relative to the XZ plane. This angle "α" keeps the zero order from being parallel to $1^{st}$ order beams, and prevents the zero order from entering the measurement signal to cause errors. More particularly, as a result of the two 2nd pass beams overlapping on the measurement grating 234, the zero order from each beam goes to the other XZ redirector, i.e. the other corner cube. If it wasn't for the angle 'α', they would otherwise likely cause CNLE.

Further, because of the angles "β" introduced by the "imperfect" XZ directors 280, 282, the +1 order (second pass) XZ measurement beam and the −1 order (second pass) XZ measurement beam can be separated for analysis and this inhibits second order beams from entering the measurement signal and causing errors. For example, if the XZ redirectors 280, 282 (i.e. the corner cubes) are designed so that angle "α" is not zero but the angle "β" is zero, the two beams would diffract and not be parallel to the grating normal, but they would be parallel to each other (+1 and −1 beams). They could then not be separated to separate output fibers by the output lens 266A or 286A. Thus, it is the angle "β" that makes the two output beams not parallel to each other.

Alternatively, if perfect corner cubes were used for the XZ directors 280, 282, it would not be possible to separate the +1 order (second pass) XZ measurement beam and the −1 order (second pass) XZ measurement beam and also have the two second pass beams overlapping on the measurement grating 234.

Figure 6A:
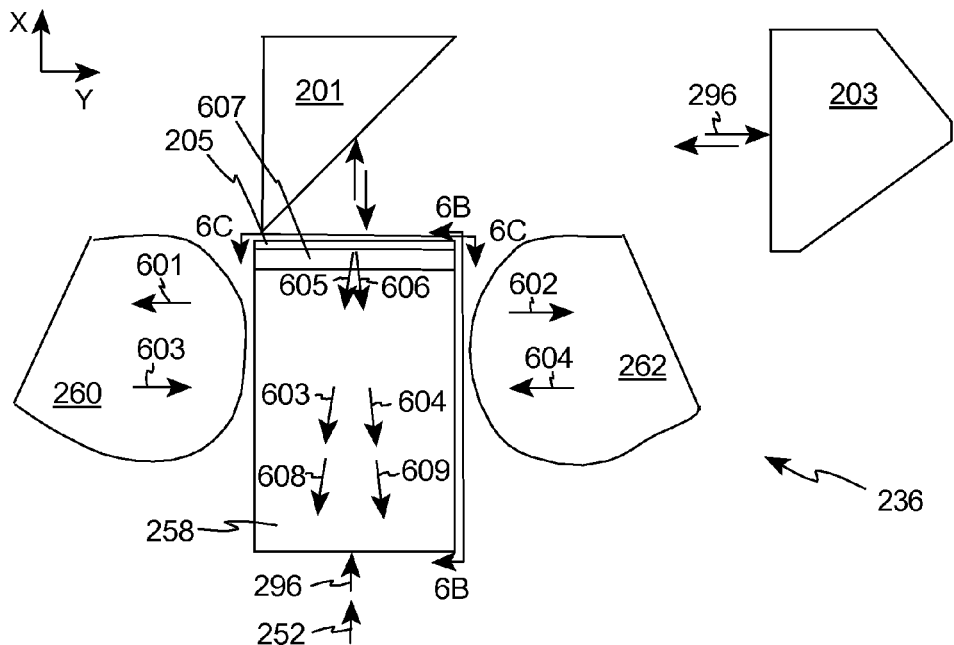
FIG. 6A is a top view of a portion of the encoder head.

FIG. 6A is a top view of a portion of the encoder head 236. In particular, FIG. 6A is a top view of the YZ module 258, the YZ redirectors 260, 262, the YZ director 201, the YZ reference redirector 203, and the YZ reference grating 205. It should be noted that the corresponding XZ components can be similar in design.

Figure 6B:
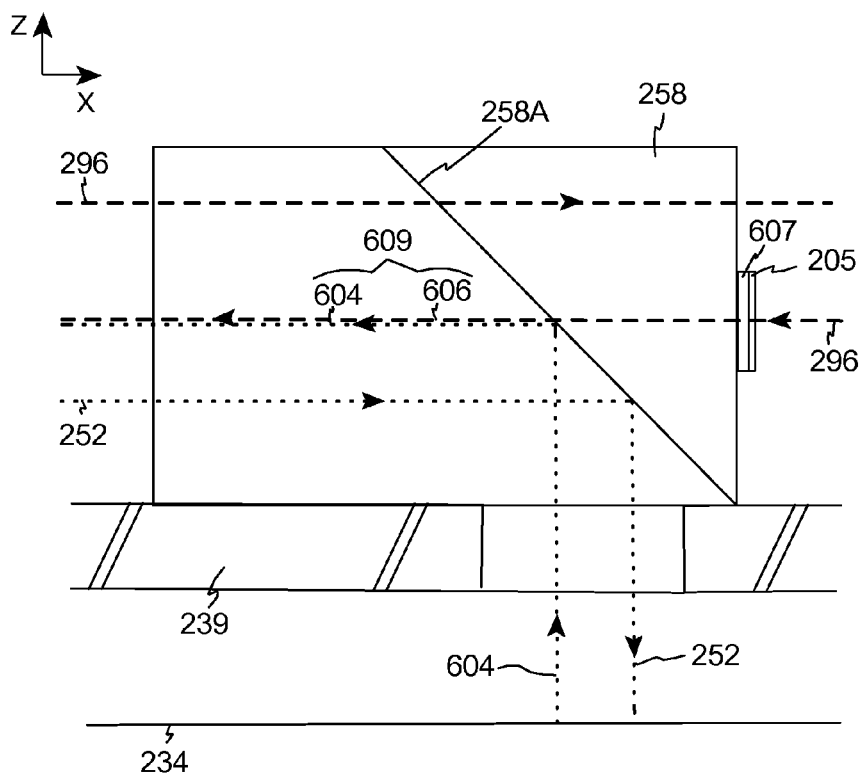
FIG. 6B is a side view of a portion of the measurement grating, and a side view taken on line 6B-6B in FIG. 6A, illustrating a portion of an encoder body, and a module having features of the present invention.

Additionally, FIG. 6B is a side view taken on line 6B-6B in FIG. 6A and illustrates a portion of the measurement grating 234, a portion of the encoder body 239, the YZ module 258, and the YZ reference grating 205. In this embodiment, the YZ measurement beam 252 and the YZ reference beam 296 enter the YZ module 258 parallel to each other along the X axis and spaced apart along the Z axis, with the YZ reference beam 296 being positioned above the YZ measurement beam 252 along the Z axis. Further, in this embodiment, the YZ module 258 can include a beam-splitter 258A.

In this embodiment, the YZ measurement beam 252 is redirected downward by the beam splitter 258A in the YZ module 258 along the Z axis at the measurement grating 234. As described above, the measurement grating 234 causes (i) a −1 order YZ measurement beam 601 (shown in FIG. 6A) to be directed upwards towards the first YZ redirector 260, and (ii) a +1 order YZ measurement beam 602 (shown in FIG. 6A) to be directed upward towards the second YZ redirector 262. In this embodiment, (i) the first YZ redirector 260 can be an "imperfect" redirector, e.g., an imperfect corner cube, that redirects the −1 order (second pass) YZ measurement beam 603 (shown in FIG. 6A) and (ii) the second YZ redirector 262 can be an "imperfect" redirector, e.g., an imperfect corner cube, that redirects the +1 order (second pass) YZ measurement beam 604 at the same location on the measurement grating 234 but at different angles.

The measurement grating 234 directs the −1 order (second pass) YZ measurement beam 603 and the +1 order (second pass) YZ measurement beam 604 upward and not parallel to each other at the YZ module 258. Next, the beam splitter 258A of the YZ module 258 redirects the −1 order (second pass) YZ measurement beam 603 and +1 order (second pass) YZ measurement beam 604 along the X axis.

In this embodiment, the YZ reference beam 296 (i) travels along the X axis through the beam splitter 258A (e.g., because of the polarization of the YZ reference beam 296) of the YZ module 258 without change, (ii) is redirected along the Y axis by the YZ director 201 at the YZ reference redirector 203 (e.g., a perfect corner cube), (iii) is redirected by the YZ reference redirector 203 back along the Y axis and shifted downward along the Z axis at the YZ director 201, and (iv) is redirected by the YZ director 201 at the YZ reference grating 205.

As noted above, in one embodiment, the YZ reference grating 205 is a one dimensional grating. With this design, the YZ reference beam 296 impinging on the YZ reference grating 205 creates the −1 order YZ reference beam 605 and the +1 order YZ reference beam 606 directed into the YZ module 258. In one embodiment, the YZ reference grating 205 is attached to the YZ module 258 with a wedged glass plate 607. In one embodiment, the angle of the wedged plate 607 is selected so that (i) the angle of the −1 order YZ reference beam 605 matches the angle of the −1 order YZ measurement beam 603, and (ii) the +1 order YZ reference beam 606 matches the angle of the +1 order YZ measurement beam 604. Stated in another fashion, the YZ reference grating 205 creates two reference beams, each parallel to one of the measurement beams. The reference beam is diffracted equally in the +1 and −1 orders to match the angle of the measurement beams, matching the angular deviations caused by beta ("β") and alpha ("α").

Additionally, in some embodiments, the YZ reference grating 205 can have a pitch T of approximately 53.0 microns (um). For example, in one non-exclusive embodiment, the nominal pitch of the reference gratings can be 53.152 um. In order to maintain an initial contrast of ninety percent (i.e. having ten percent contrast loss), the tilt limit can be defined as λ/4 over four millimeters. In one embodiment, with a wavelength (λ) of 632.8 nm, this results in A tan(632.8 nm/(4*4 mm))=39 urad or 8.2 arcsec. Further, to maintain the initial contrast at ninety percent, the pitch is kept within +/−0.34 percent of the nominal pitch. Thus, in this non-exclusive embodiment, the reference gratings can have a pitch of 53.152 um +/−0.182 um. Stated another way, in such embodiment, the maximum pitch allowed is 53.329 um. Moreover, with this design, temperature changes of the encoder head 28 may not change the pitch enough to cause tilt fringes.

In the YZ module 258, the +1 and −1 order YZ measurement beams 604, 603 are combined with the +1 and −1 order YZ reference beams 606, 605 (that travel through the beam splitter 258A) to form the −1 order YZ interfering beam 608, and the +1 order YZ interfering beam 609. More specifically, (i) the +1 order YZ measurement beam 604 is combined with (and interferes with) the +1 order YZ reference beam 606 in the YZ module 258 to form the +1 order YZ interfering beam 608, and (ii) the −1 order YZ measurement beam 603 is combined with (and interferes with) the −1 order YZ reference beam 605 in the YZ module 258 to form the −1 order YZ interfering beam 608.

It should be noted that the angles and the separation of these beams are exaggerated in FIG. 6A for clarity. Instead, (i) the YZ measurement beams 603, 604 redirected by the beam splitter 258A are mostly overlapping, and (ii) the YZ reference beams 605, 606 that travel through the beam splitter 258A are mostly overlapping. As a result thereof, the YZ interfering beams 608, 609 exiting the beam splitter 258A are mostly overlapping.

In certain embodiments, the polarization of the YZ measurement beam 252 is selected to enable efficient reflection off of the beam splitter 258A and the measurement grating 234. Also, the polarization of the YZ reference beam 296 is selected to transmit efficiently through the beam splitter 258A. In certain embodiments, the beam splitter 258A is a polarization beam splitter. Thus, when the YZ measurement beam 604 and the YZ reference beam 606 are combined as shown in FIG. 6B, they are in orthogonal polarization states. Therefore, a polarizer, oriented nominally at 45 degrees relative to either linear polarization state of the inteferent beams, can be used to obtain interference between measurement and reference beams. As non-exclusive examples, the polarizer could be at the center of the left output surface of beam splitter 258 in FIG. 6B, or at the center of the Anamorphic prism pair aperture in FIG. 3B or 3C, such that only beams 267A and 267B transmit through the polarizer.

Figure 6C:
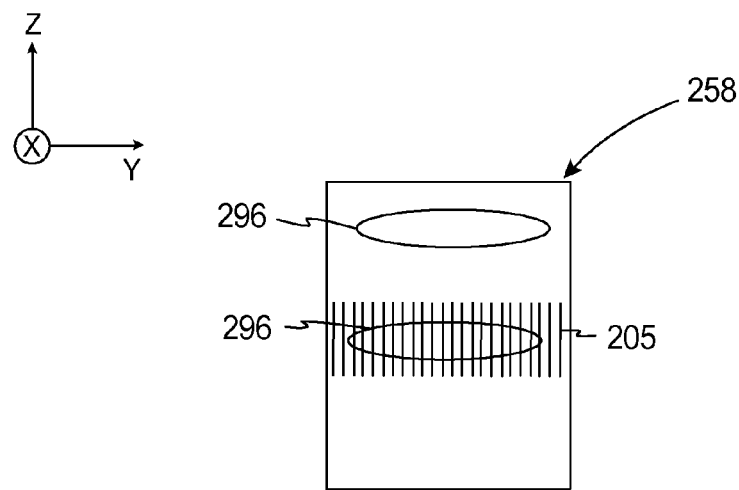
FIG. 6C is a simplified view of the module taken on line 6C-6C in FIG. 6A.

FIG. 6C is a simplified view of the YZ module 258 taken on line 6C-6C in FIG. 6A. More particularly, FIG. 6C illustrates the oval shaped reference beam 296 exiting the YZ module 258, and the oval shaped reference beam 296 returning (at a lower position along the Z axis) to impinge on the reference grating 205.

Figure 7:
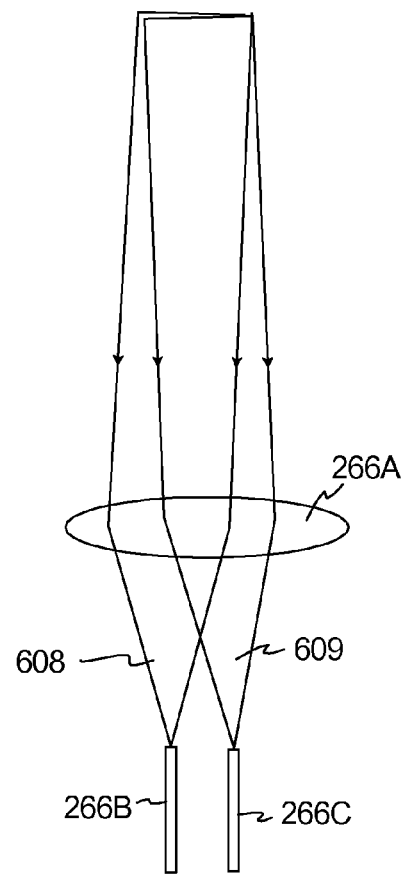
FIG. 7 is a simplified illustration of a portion of two interfering beam sets, a fiber coupler, and a pair of optical fibers.

FIG. 7 is a simplified illustration of a portion of the YZ interfering beams 608, 609, a fiber coupler (e.g., the lens 266A), and a pair of optical fibers, i.e. the first YZ fiber 266B and the second YZ fiber 266C. The overlapping nature of the YZ interfering beams 608, 609 at the YZ module 258 (not shown in FIG. 7) means they will overlap for a long axial distance after the grating 234 (not shown in FIG. 7). Using a large 'imperfect' angle leads to tip/tilt related contrast loss, so the 'imperfect' angle must be kept small. In one non-exclusive embodiment, an angle of approximately +/−0.66° is used after the measurement grating 234. The anamorphic prism pair, i.e. the YZ beam shape adjuster 256 (not shown in FIG. 7), increases this angle to approximately two degrees. To fully separate the interfering beams 608, 609 by four millimeters, they must travel axially by 4/tan(2*2)=58.0 millimeters, which can require a lot of fold mirrors to maintain a small package size for the encoder head 236.

Instead, in certain embodiments, the two overlapping interfering beams 608, 609 can be coupled into the two separate multimode fibers 266B, 266C using the single lens 266A. In one non-exclusive example, for a four degree beam separation (+/−2°), the lens 266A can have an 18.0 millimeter focal length, with the two fibers 266B, 266C placed 1.25 millimeters apart will capture the two signals. Standard fiber ferrules 1.25 millimeters in diameter are commercially available.

With the present design, the only polarization optics are the polarization beamsplitters and the polarizers used to combine the reference and measurement beams; with everything else being amplitude based. Moreover, the beamsplitters could also be amplitude based without any loss of efficiency, although stray light management might become more critical in this case. Additionally, the power distribution could be paired with another sensor to maximize system light efficiency.

In this design, the respective reference beam relates to the measurement of everything that is changing in the system except for the position of the measurement grating 234, and the measurement beam relates to the measurement of everything changing in the system including the position of the measurement grating 234. By monitoring the change between these two, the position of the measurement grating can be accurately measured.

Figure 8A:
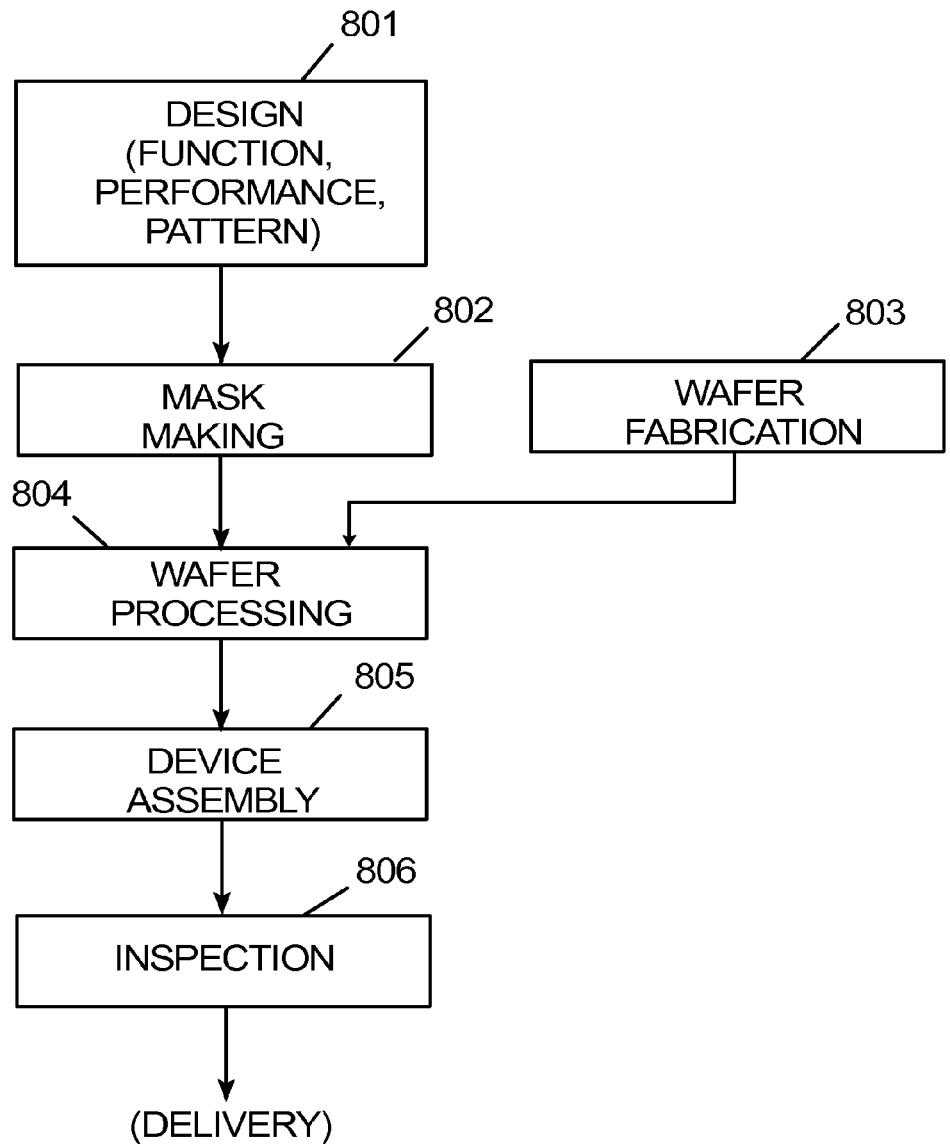
FIG. 8A is a flow chart that outlines a process for manufacturing a device in accordance with the embodiment of the present invention.

Semiconductor devices can be fabricated using the above described systems, by the process shown generally in FIG. 8A. In step 801, the device's function and performance characteristics are designed. Next, in step 802, a mask (reticle) having a pattern is designed according to the previous designing step, and in a parallel step 803, a wafer is made from a silicon material. In step 804, the mask pattern designed in step 802 is exposed onto the wafer from step 803 by a photolithography system described hereinabove in accordance with an embodiment of the present invention. In step 805, the semiconductor device is assembled (including the dicing process, bonding process and packaging process). Finally, the device is then inspected in step 806.

Figure 8B:
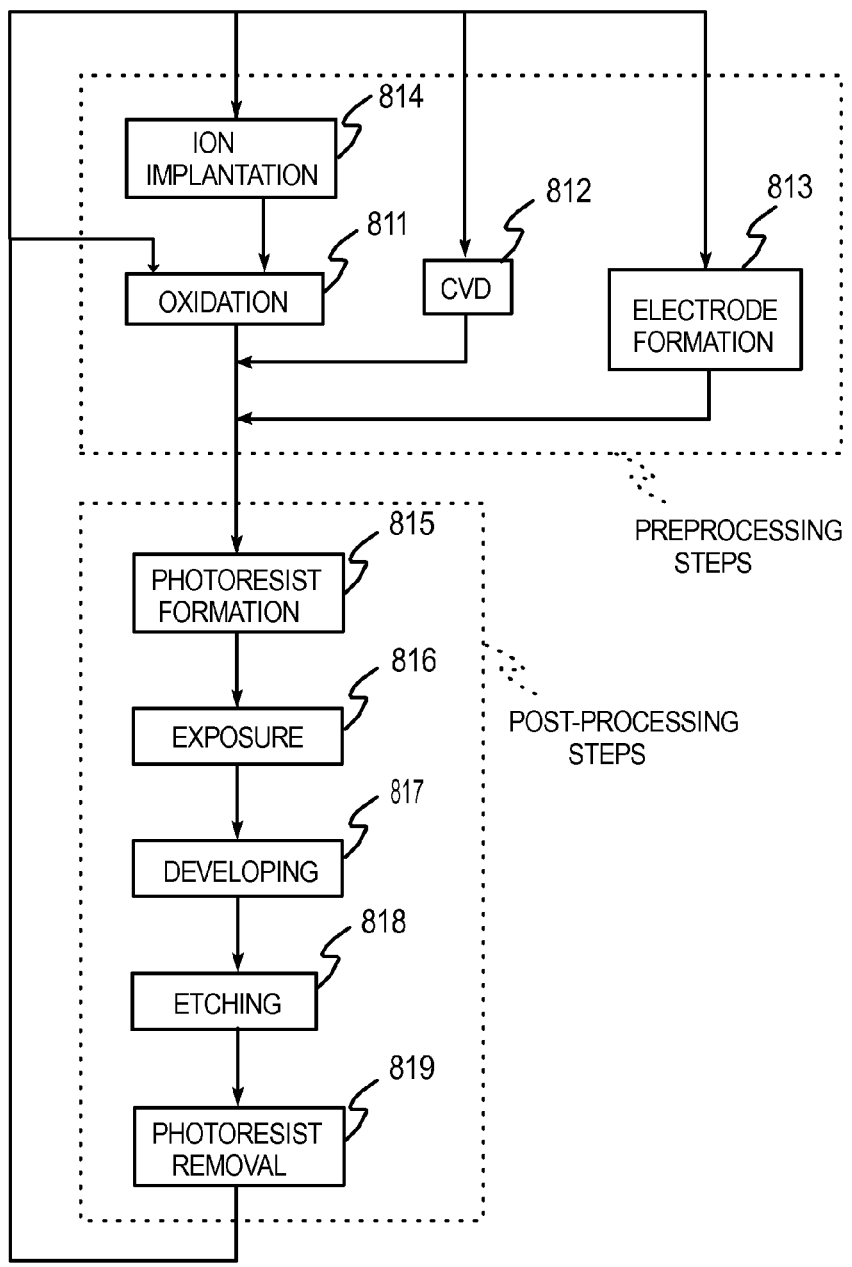
FIG. 8B is a flow chart that outlines device processing in more detail.

FIG. 8B illustrates a detailed flowchart example of the above-mentioned step 804 in the case of fabricating semiconductor devices. In FIG. 8B, in step 811 (oxidation step), the wafer surface is oxidized. In step 812 (CVD step), an insulation film is formed on the wafer surface. In step 813 (electrode formation step), electrodes are formed on the wafer by vapor deposition. In step 814 (ion implantation step), ions are implanted in the wafer. The above mentioned steps 811-814 form the preprocessing steps for wafers during wafer processing, and selection is made at each step according to processing requirements.

At each stage of wafer processing, when the above-mentioned preprocessing steps have been completed, the following post-processing steps are implemented. During post-processing, first, in step 815 (photoresist formation step), photoresist is applied to a wafer. Next, in step 816 (exposure step), the above-mentioned exposure device is used to transfer the circuit pattern of a mask (reticle) to a wafer. Then in step 817 (developing step), the exposed wafer is developed, and in step 818 (etching step), parts other than residual photoresist (exposed material surface) are removed by etching. In step 819 (photoresist removal step), unnecessary photoresist remaining after etching is removed. Multiple circuit patterns are formed by repetition of these preprocessing and post-processing steps.

While a number of exemplary aspects and embodiments of a measurement system 22 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A measurement system for measuring relative movement of a first object and a second object, the first object and the second object being movable relative to each other, the measurement system comprising:
   a measurement grating coupled to one of the first object and the second object; and
   an encoder head that directs a measurement beam at the measurement grating;
   wherein the measurement beam impinging on the measurement grating creates a +1 order measurement beam and a −1 order measurement beam directed back at the encoder head; and
   wherein the +1 order measurement beam from the measurement grating is directed at an imperfect first redirector that directs a +1 order second pass beam at the measurement grating, and wherein the −1 order measurement beam from the measurement grating is directed at an imperfect second redirector that directs a −1 order second pass beam at the measurement grating; and
   wherein a plane of incidence of the +1 order second pass beam is not parallel to a plane of incidence of the −1 order second pass beam.

2. The measurement system of claim 1, wherein the measurement beam has a cross sectional shape at the measurement grating with a first dimension along a first direction and a second dimension along a second direction that crosses the first direction, the first dimension being larger than the second dimension.

3. The measurement system of claim 2, wherein the shape of the measurement beam at the measurement grating has an oval shaped cross section.

4. The measurement system of claim 3 wherein the encoder head receives an input measurement beam having a substantially circular cross-sectional shape, and wherein the encoder head includes a beam shape adjuster positioned in the path of the input measurement beam that transforms the input measurement beam to provide the measurement beam having the oval shaped cross-section.

5. The measurement system of claim 4 wherein the beam shape adjuster includes a prism pair that transforms the input measurement beam to provide the measurement beam having the oval shaped cross-section.

6. The measurement system of claim 1 wherein the +1 order second pass beam and the −1 order second pass beam impinge at approximately the same location on the measurement grating.

7. The measurement system of claim 1 further comprising a reference grating mounted to the encoder head, and a reference beam that is directed at the reference grating to create (i) a +1 order reference beam that is combined with the +1 order second pass beam at a module to form a +1 order interfering beam; and (ii) a −1 order reference beam that is combined with the −1 order second pass beam at the module to create a −1 order interfering beam.

8. The measurement system of claim 7 wherein the interfering beams are partly overlapping at the module.

9. The measurement system of claim 7 wherein the encoder head includes a beam shape adjuster positioned in the path of the interfering beams that transforms the interfering beams having an oval shaped cross-section to beams having a substantially circular cross-sectional shape.

10. The measurement system of claim 7 wherein the interfering beams are directed at a single lens that focuses the +1 order interfering beam onto a first optical fiber and focuses the −1 order interfering beam onto a second optical fiber.

11. A combination that moves a first object relative to a second object, the combination comprising (i) a stage assembly including a stage that retains the first object, and a stage mover assembly that moves the stage and the first object relative to the second object, and (ii) the measurement system of claim 1 that measures the position of the first object relative to the second object.

12. An exposure apparatus for transferring a pattern to a first object, the exposure apparatus including an illumination system that emits a beam that is used to transfer the pattern to the first object, an optical assembly that focuses light on the first object, a second object that includes an optical assembly, and the combination of claim 11 that moves the stage and the first object relative to the second object and measures the position of the first object relative to the second object.

13. A process for manufacturing a device that includes the steps of providing a substrate and forming an image on the substrate with the exposure apparatus of claim 12.

14. The measurement system of claim 1, wherein the measurement grating is a two dimensional grating.

15. A measurement system for measuring a relative movement of a first object and a second object, the first object and the second object being movable relative to each other, the measurement system comprising:
   a measurement grating coupled to one of the first object and the second object; and
   an encoder head that directs a measurement beam at the measurement grating; wherein the measurement beam impinging on the measurement grating creates a +1 order measurement beam and a −1 order measurement beam directed back at the encoder head; wherein the +1 order measurement beam from the measurement grating is directed at an imperfect first redirector that directs a +1 order second pass beam at the measurement grating, and wherein the −1 order measurement beam from the measurement grating is directed at an imperfect second redirector that directs a −1 order second pass beam at the measurement grating; and wherein a plane of incidence of the +1 order second pass beam on the measurement grating is not parallel to a plane of incidence of the −1 order second pass beam on the measurement grating.

16. The measurement system of claim 15 wherein the +1 order second pass beam and the −1 order second pass beam impinge at approximately the same location on the measurement grating.

17. The measurement system of claim 15 wherein the encoder head receives an input measurement beam having a substantially circular cross-sectional shape, and wherein the encoder head includes a beam shape adjuster positioned in the path of the input measurement beam that transforms the input measurement beam to provide the measurement beam having an oval shaped cross-section.

18. The measurement system of claim 15 further comprising a reference beam that is directed at a reference grating to create (i) a +1 order reference beam that is combined with the +1 order second pass beam at a module to form a +1 order interfering beam; and (ii) a −1 order reference beam that is combined with the −1 order second pass beam at the module to create a −1 order interfering beam.

19. The measurement system of claim 18 wherein the interfering beams are directed at a single lens that focuses the +1 order interfering beam onto a first optical fiber and focuses the −1 order interfering beam onto a second optical fiber.

20. A method for measuring a relative movement of a first object and a second object, the first object and the second object being movable relative to each other, the method comprising:
coupling a measurement grating to one of the first object and the second object;
directing a measurement beam at the measurement grating with an encoder head, wherein the measurement beam impinging on the measurement grating creates a +1 order beam and a −1 order beam directed back at the encoder head;
directing the +1 order beam from the measurement grating at an imperfect first redirector;
directing a +1 order second pass beam at the measurement grating with the imperfect first redirector;
directing the −1 order beam from the measurement grating is directed at an imperfect second redirector;
directing a −1 order second pass beam at the measurement grating with the imperfect second redirector;
directing a reference beam at a reference grating to create a +1 order reference beam and a −1 order reference beam;
combining the +1 order reference beam with the +1 order second pass beam at a module to form a +1 order interfering beam; and
combining the −1 order reference beam with the −1 order second pass beam at the module to create a −1 order interfering beam.

21. The method of claim 20 further comprising the steps of directing the +1 order interfering beam at a lens that focuses the +1 order interfering beam onto a first optical fiber; and directing the −1 order interfering beam at the lens that focuses the −1 order interfering beam onto a second optical fiber.

22. The method of claim 20 wherein the step of directing the measurement beam includes the measurement beam having a cross sectional shape at the measurement grating with a first dimension along a first direction and a second dimension along a second direction that crosses the first direction, the first dimension being larger than the second dimension.

23. The method of claim 22, wherein the shape of the measurement beam at the measurement grating has an oval shaped cross section.

24. The method of claim 23 further comprising the steps of receiving an input measurement beam with the encoder head, the input measurement beam having a substantially circular cross-sectional shape, and positioning a beam shape adjuster in the path of the input measurement beam that transforms the input measurement beam to provide the measurement beam having the oval shaped cross-section.

25. A measurement system for measuring relative movement of a first object and a second object, the first object and the second object being movable relative to each other, the measurement system comprising:
a measurement grating coupled to one of the first object and the second object; and
an encoder head that directs a measurement beam at the measurement grating;
wherein the measurement beam impinging on the measurement grating creates a +1 order measurement beam and a −1 order measurement beam directed back at the encoder head; and
wherein the +1 order measurement beam from the measurement grating is directed at an imperfect first redirector that directs a +1 order second pass beam at the measurement grating, and wherein the −1 order measurement beam from the measurement grating is directed at an imperfect second redirector that directs a −1 order second pass beam at the measurement grating;
wherein the imperfect first redirector includes a corner cube and a wedge prism.

* * * * *